Nov. 23, 1971   J. D. ROBERTSON   3,621,585
MATERIALS DRYER

Filed Oct. 31, 1969   4 Sheets-Sheet 1

INVENTOR
JOE D. ROBERTSON

BY Jones & Thomas

ATTORNEYS

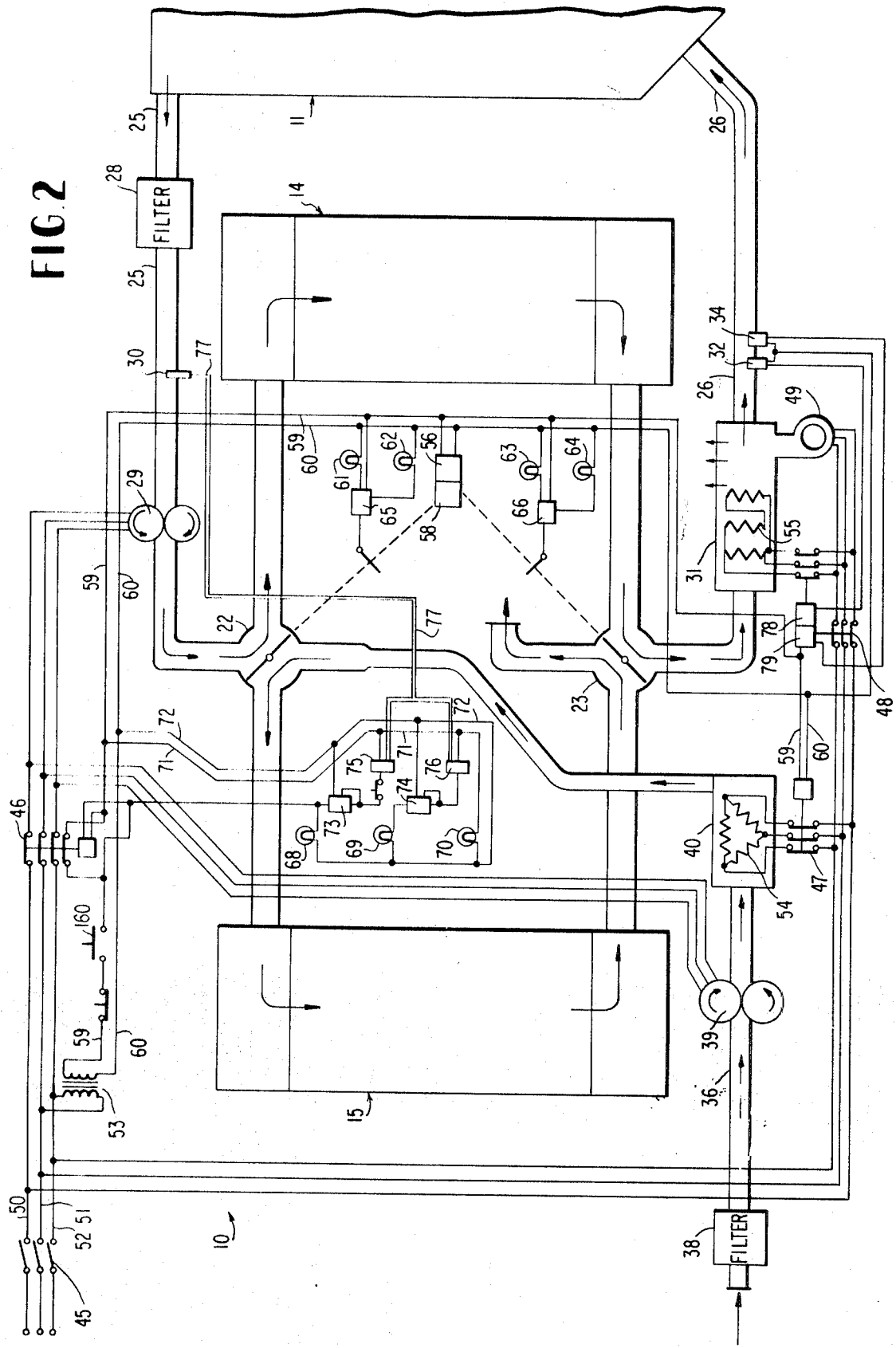

Nov. 23, 1971

J. D. ROBERTSON 3,621,585

MATERIALS DRYER

Filed Oct. 31, 1969

United States Patent Office 3,621,585
Patented Nov. 23, 1971

3,621,585
MATERIALS DRYER
Joseph D. Robertson, 980 Swathmore Drive NW.,
Atlanta, Ga. 30327
Filed Oct. 31, 1969, Ser. No. 873,002
Int. Cl. F26b 3/10
U.S. Cl. 34—10                                   23 Claims

ABSTRACT OF THE DISCLOSURE

A materials dryer for drying or dehumidifying particulate hygroscopic plastics materials or similar materials that are stored in and dispensed from a closed hopper. The air from the hopper is passed in a closed loop stream at constant volume flow through a filter, a first desiccant bed, a heat exchanger to control the temperature of the air, and back to the materials hopper. In the meantime, a second stream of air is passed through a filter, an air heater which heats the air to the optimum desiccant drying temperature above 400 degrees Fahrenheit, and through a second desiccant bed to remove the moisture from the second desiccant bed. After a time interval, when the first desiccant bed has accumulated a relatively high moisture content, the closed loop air stream from the materials hopper is switched from the first desiccant bed to the hot dry desiccant bed, and the hot drying air stream is switched to the moist desiccant bed. The heat exchanger controls the temperature of the closed loop air stream so that the air stream whether flowing from a hot or cool desiccant bed, is at the optimum material drying temperature as it enters the materials hopper.

BACKGROUND OF THE INVENTION

When granular or particulate hygroscopic plastics or similar hygroscopic materials are stored in a hopper and dispensed to a manufacturing process, it is desirable, usually necessary, to dry the material before it is passed through the manufacturing process. In the past, the hygroscopic plastics have been dried in open drying trays or have been dried right in the dispensing hopper to assure the dryness of the material just prior to its being processed through the manufacturing steps. The drying of the hygroscopic material has been achieved by flowing a stream of air through a desiccant bed or other drying apparatus and then into the dispensing hopper in an open or closed loop circuit, with the moist air removed from the hopper being routed back through the desiccant bed in the closed loop system. In this manner, the hygroscopic material in the hopper is continuously dried so that any moisture from the materials in the hopper will usually be removed from the materials.

After the desiccant bed in a closed loop air stream has become saturated with moisture and loses its drying effectiveness, the desiccant bed must be removed from the air stream and dried or dehumidified. In the past, several methods have been utilized to dry a saturated desiccant bed. One method has been to terminate the air flow through the dispensing hopper and the saturated desiccant bed and flow drying air from another source through the saturated desiccant bed to regenerate the saturated desiccant. Obviously, when the flow of drying air to the materials hopper has stopped, the drying of the material in the materials hopper also terminates, so that the hazard of dispensing wet material from the hopper is increased.

Another method of regenerating a saturated desiccant bed is to regenerate one inactive desiccant bed and to continuously bleed off air from the "closed" loop air stream as the wetter air passes from the materials hopper toward the desiccant bed in use and replace this air with air from the atmosphere. Of course, the humidity of the air from the atmosphere cannot be controlled to any substantial extent, so moisture is introduced from atmosphere to the closed loop system, a portion of which must be removed by the desiccant bed in use, thus imposing a moisture load on this bed from sources other than the material being dried. Furthermore, the air flow rate through the desiccant bed being regenerated is not precisely controlled and can vary with pressure changes in the recirculating air loop. This also results in a variation in air flow to the material being dried.

In another system utilizing two desiccant beds, one desiccant bed is used in a closed loop air stream to dry the material in the materials hopper and the other desiccant bed is regenerated by the flow of hot air through the bed. In such a system, it would be desirable to regenerate the moist desiccant bed at a relatively high temperature suitable for optimum desiccant drying, a temperature level above 400 degrees Fahrenheit; however, most hygroscopic plastic materials become unstable at a temperature level above 300 degrees Fahrenheit and cannot tolerate the very high temperature required for optimum drying of a desiccant bed. Thus, the moist desiccant bed has been dryed at a lower temperature. The low temperature drying of a desiccant bed results in inefficient drying, leaving a substantial residual moisture in the bed, thus reducing effective available bed capacity for material drying and also resulting in higher recirculating dew points.

SUMMARY OF THE INVENTION

Briefly described, the present invention comprises a materials dryer and a drying system which operate automatically and continuously to dry and maintain a particulate hygroscopic or non-hygroscopic plastic material or other materials in a materials dispensing hopper or the like in a dry condition. A continuous flow of dry air or gas is passed through the dispensing hopper so that the moisture within the hygroscopic material and the hopper is continuously absorbed by the air and discharged from the hopper. The air passed from the hopper is processed through a first desiccant bed to remove the moisture from the air, and the air is then routed back to the materials hopper, in a substantially closed loop air stream. When the first desiccant bed becomes saturated with moisture a second desiccant bed is substituted therefor in the closed loop air stream without interruption of the air flow through the materials hopper.

The saturated desiccant bed removed from the closed loop system is regenerated by passing hot air or gas through the bed at a high temperature, substantially higher than the temperature of the air flowing through the materials hopper, to achieve optimum drying of the desiccant. The regenerated desiccant bed is subsequently placed back in the closed loop air stream, and the switching of the air streams back and forth between the desiccant beds continues to provide a dry stream of air to the materials hopper. The flow of air into the materials hopper is maintained within a prescribed temperature range, which is the optimum temperature range for the drying of the particular hygroscopic plastic material in the hopper.

Thus, it is an object of this invention to provide a materials dryer which functions continuously to dry particulate hygroscopic materials and the like.

Another object of this invention is to provide a materials drying system which utilizes a pair of desiccant beds to dry an air stream, with one desiccant bed being used in the drying air stream while the other desiccant bed is being regenerated.

Another object of this invention is to provide a dryer for maintaining hygroscopic materials in a dry condition and suitable for use in further processing, wherein a pair of desiccant beds are repeatedly and alternately placed in a closed loop air stream used to remove moisture from the materials and placed in a hot air regeneration air stream.

Another object of this invention is to provide a materials dryer that maintains particulate hygroscopic plastic materials and similar materials in a dry state in varying weather and humidity conditions, which operates continuously without the attention of an operator, which includes an indicating system for illustrating its operative conditions, and which is inexpensive to manufacture and operate.

Other objects, features and advantages of the present invention will become apparent upon reading the following specification, when taken into conjunction with the accompanying drawing.

BRIEF DESCRIPTION OF THE DRAWING

FIG. 2 is a schematic illustration of the materials dryer showing the electrical controls of the elements in the system.

DESCRIPTION OF THE PREFERRED EMBODIMENTS

Figure 1:
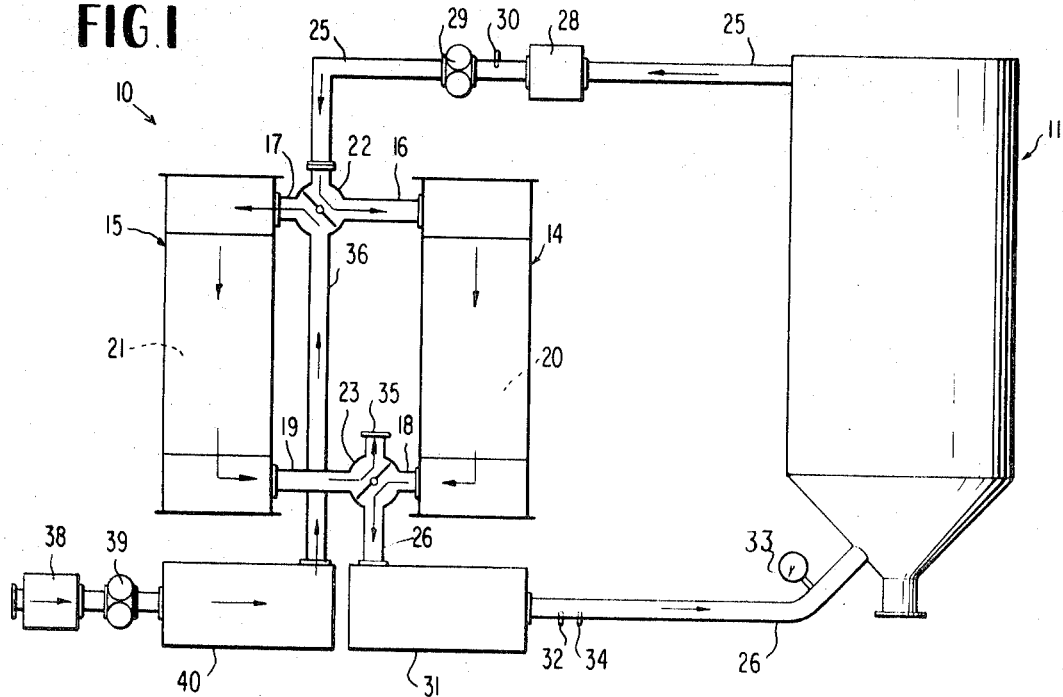
FIG. 1 is a schematic illustration of the materials dryer.

Referring now in more detail to the drawing, in which like numerals indicate like parts throughout the several views, FIG. 1 shows materials dryer 10 connected to materials hopper 11. Hopper 11 is usually positioned in a location adjacent a process system for molding or otherwise working with plastics. A supply of materials, such as particulate, hygroscopic plastic material mass, is stored in hopper 11 and dispensed from hopper 11 as needed, either continuously or intermittently.

Materials dryer 10 includes a pair of desiccant towers 14 and 15 which include upper inlet conduits 16 and 17 and lower exhaust conduits 18 and 19. Desiccant beds 20 and 21 are located in desiccant towers 14 and 15, respectively. Inlet and exhaust conduits 16–19 are connected to air diverter valves 22 and 24 which are schematically illustrated as being separate four-way valves, but which operate simultaneously and can be operated independently or integrated into a single valve structure, if desired. Air diverter valves 22 and 23 are each four-way valves and function to divert or control the flow of two streams of air in a manner more fully described hereinafter.

Materials hopper 11 is connected at its upper end by outlet conduit 25 and at its lower end by inlet conduit 26 to materials dryer 10. Air filter 28 is positioned in outlet conduit 25 for the purpose of filtering the flow of air through conduit 25. Positive displacement blower 29 is positioned in conduit 25 and functions to pump air from materials hopper 11 through air filter 28 and toward one or the other of desiccant towers 14 and 15. Pressure sensing device 30 communicates with outlet conduit 25 between filter 28 and blower 29. The discharge end of outlet conduit 25 communicates with air diverter valve 22.

Inlet conduit 26 communicates with air diverter valve 23 through heat exchanger 31. A pair of temperature sensors 32 and 34 and thermometer 33 are positioned in inlet conduit 26 downstream of heat exchanger 31. Four-way air diverter valve 23 also communicates with the atmosphere through its discharge opening 35, and four-way air diverter valve 22 also communicates with hot air inlet conduit 36. Filter 38, positive displacement blower 39, and air heater 40 are also positioned in hot air inlet conduit 36 and function to filter, pump and heat the air flowing from the atmosphere toward air diverter valve 22.

As is best shown in FIG. 2, materials dryer 10 is operated by an electrical control system for operating the blowers, valves, heaters and indicating lights of the materials dryer. Positive displacement blower 29 in outlet conduit 25, blower 39 and heater 54 in hot air inlet conduit 36, and heat exchanger blower 49 and heater 55 of heat exchanger 31 are all connected to the three-phase power lines 50, 51 and 52 through main switch 45 and relay switches 46, 47, and 48. Voltage reducing transformer 53 powers the indicating and switching system. Timer 56 and solenoid 58 are connected to conductors 59 and 60 and switch 46 to transformer 48. Solenoid 58 functions to operate air diverter valves 22 and 23, and timer 56 functions to operate solenoid 58 at predetermined time intervals. Indicating lights 61, 62, 63, and 64 are electrically connected to conductors 59 and 60 through double pole microswitches 65 and 66. When air diverter valve 22 is in the position illustrated in FIG. 2, switches 65 and 66 cause green indicating light 61 and red indicat-light 64 to be illuminated, while indicating lights 64 and 61 will not be illuminated. This indicates that desiccant tower 14 is being used to dry the material in hopper 14 while desiccant tower 15 is being regenerated. When the air diverter valves are shifted, by solenoid 58, switches 65 and 66 cause indicating lights 62 and 63 to be illuminated, while indicating lights 61 and 64 will not be illuminated. This indicates that desiccant tower 14 has been switched to its regenerating cycle and desiccant tower 15 is being used to dry the material.

Red, amber and green indicating lights 68, 69 and 70 are eletcrically connected to conductors 59 and 60 through conductors 71 and 72 and relay switches 73 and 74. Relay switches 73 and 74 are controlled by pressure switches 75 and 76 which are actuated by pressure sensing conduit 77. Relay switch 46 is in series connection with indicating light 68 and functions to control switch 46 in the three phase power lines. The circuit is constructed so that green indicating light 70 is continuously illuminated when switch 45 is closed and amber and red indicating lights 68 and 69 are illuminated in response to an increase in pressure drop at suction side of pump. When the pressure drop is excessive, which indicates that filter 28 should be cleaned or replaced, or other blockage should be removed from the system, red light 68 will be illuminated and relay switch 46 opened to open the circuit to the blowers and heaters of the system.

Temperature sensors 32 and 34 inlet conduit 26 control heat element 55 and blower 49. Heater element 55 is connected to power lines 50, 51 and 52 through relay 78 and blower 49 is connected to power lines 50, 51 and 52 through relay 79. Temperature sensor 32 controls the operation of relay 78 and temperature sensor 34 controls the operation of relay 79. When temperature of the air from heat exchanger 31 is too low, temperature sensor 32 closes relay 78 to energize heater 55. When the temperature of the air from heat exchanger 31 is too high, temperature sensor 34 closes relay 79 to energize blower 49. With this arrangement, the air flowing through inlet conduit 26 into materials hopper 11 is always maintained in a predetermined range of temperatures, as set by temperature sensors 32 and 34.

Figure 3:
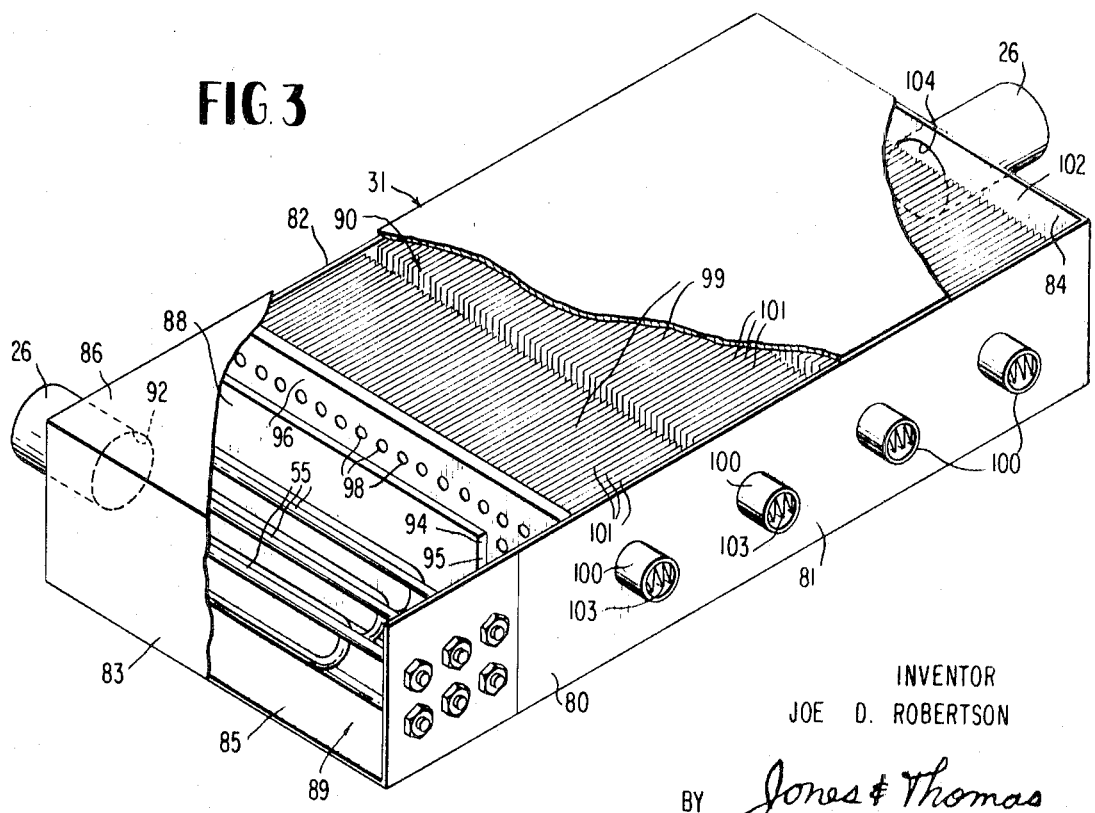
FIG. 3 is a perspective view, with parts broken away, of the heat exchanger.

As is best shown in FIG. 3, heat exchanger 31 comprises a housing 80 having side walls 81 and 82, end walls 83 and 84, bottom wall 85, and top wall 86. Internal partition 88 divides housing 80 into heating chamber 89 and cooling chamber 90. Electrical heating elements 55 are positioned in heating chamber 89. Air inlet 92 opens through side wall 82 and communicates with inlet conduit 26. Partition 88 is connected to side wall 82 adjacent air inlet opening 92, and extends across housing 80 toward the opposite side wall 82. The opposite edge 94 of partition 88 is spaced from side wall 81 and forms an air passage 96 between heating chamber 89 and cooling chamber 90. Spreader plate 96 is spaced from partition 88 and defines a plurality of small air openings 98 throughout its length and width.

A plurality of heat exchanging elements 99 are located in cooling chamber 90. Each heat exchanging element 99 includes a conduit 100 extending through side walls 81 and 82 and laterally across the length of cooling chamber 90, and a plurality of generally rectangular fins 101 surrounding the conduit. Fins 101 are oriented normal to the axis of each conduit 100 and the last heat exchanging element 99 is spaced from end wall 84 to form plenum chamber 102. Air opening 104 in end wall 84 is connected to inlet conduit 26 of materials hopper 11.

Conduits 100 each have folded metal strips 103 positioned therein and extending along a major portion of their lengths to increase the transfer of heat between the air flowing through conduits 100 and the internal surfaces of the conduits.

Figure 4:
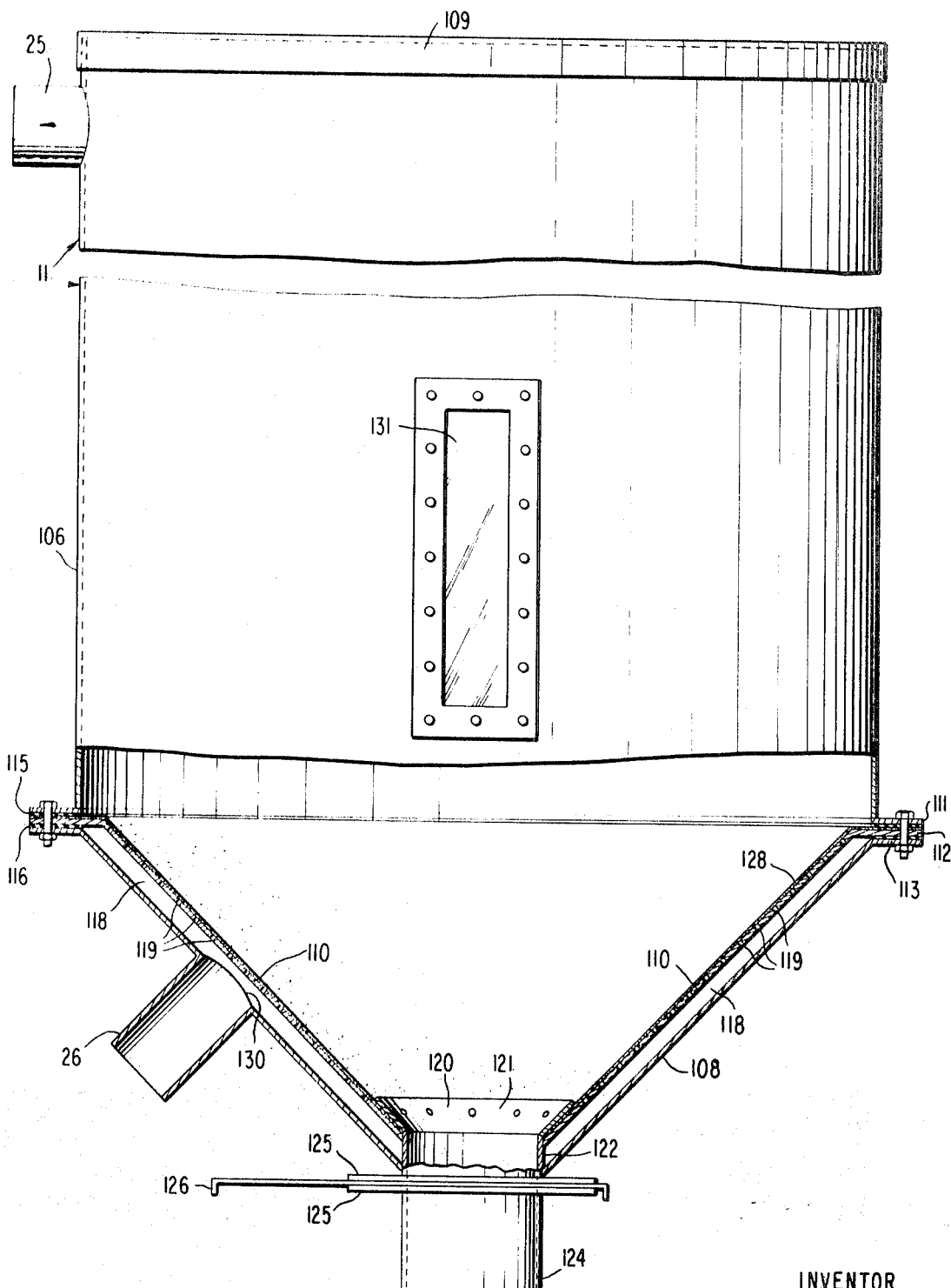
FIG. 4 is a side elevational view of the materials hopper, with parts broken away and parts in section.

As is best shown in FIG. 4, materials hopper 11 comprises upper cylindrical portion 106 and lower conical portion 108. The upper end of cylindrical portion 106 is closed by cover 109 and outlet conduit 25 communicates with the upper end of cylindrical portion 106. Conical insert 110 generally conforms in size and shape with lower conical portion 108 and is rigidly connected to materials hopper 11 by means of abutting annular flanges 111, 112, and 113 at the junction of upper cylindrical portion 106 and lower conical portion 108. Intermediate annular gaskets 115 and 116 assure that an air tight seal is maintained in this area.

Conical insert 110 is shaped so as to be spaced from lower conical portion 108, so that a substantially annular, conical airflow chamber 118 is formed at the bottom of materials hopper 11. Conical insert 110 defines a plurality of small air openings 119 throughout its entire surface. Clamp ring 120 is connected to conical insert 110 at its lower opening. Clamp ring 120 includes conical portion 121 connected to conical insert 110 and cylindrical portion 122 that abuts lower conical portion 108 of the materials hopper. Drop out tube 124 is coextensive with cylindrical portion 122 and forms a discharge opening for hopper 11. A pair of slide flanges 125 are positioned in drop out tube 124, and valve plate 126 is slideably received between flanges 125 and functions to open or close drop out tube 124.

Air dispersal sheet 128 is placed over the inside surface of conical insert 110. Air dispersal sheet 128 is generally of a size and shape similar to conical insert 110 and is clamped at its bottom by conical flange 121 of clamp ring 120 and at its top by gasket 115 and flange 112 of conical insert 110. Air opening 130 in lower conical portion 108 communicates with inlet conduit 26 from materials dryer 10. With this arrangement, the air flowing through inlet conduit 26 enters annular conical air flow space 118 and passes through the plurality of air openings 119 of conical insert 110, and through air dispersal sheet 128. Conical insert 110 assures that the air is dispersed evenly about air dispersal sheet 128, and air dispersal sheet 128 further disperses the air so that the air is received in materials hopper 11 in a gentle upward flow from virtually the entire surface of air dispersal sheet 128, without any channeling or streaming of air in the material stored in materials hopper 11. This flow characteristic tends to fluidize the material in the materials hopper. Window opening 131 provides a means for visually inspecting the volume of hydroscopic plastic material present in hopper 11.

Figure 5:
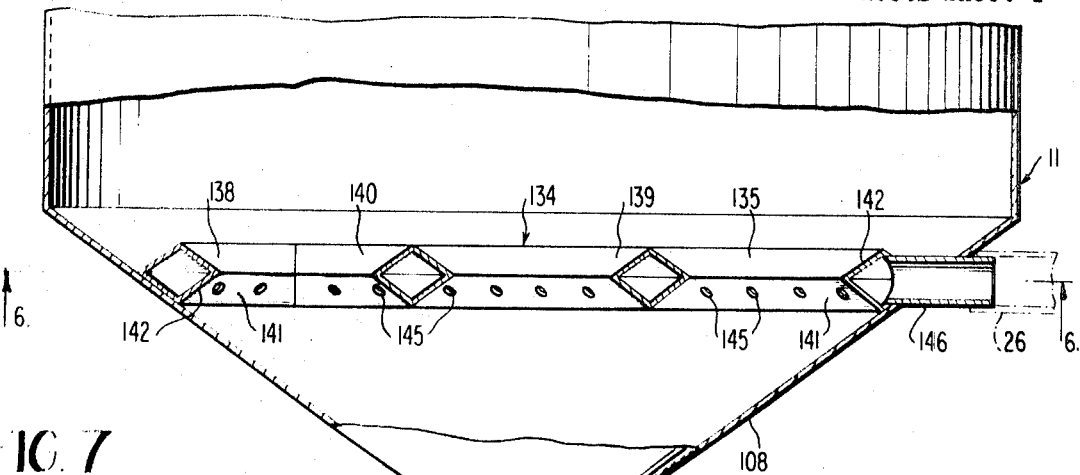
FIG. 5 is a side cross-sectional view of the materials hopper, similar to FIG. 4, but showing a modified form of the invention.
Figure 7:
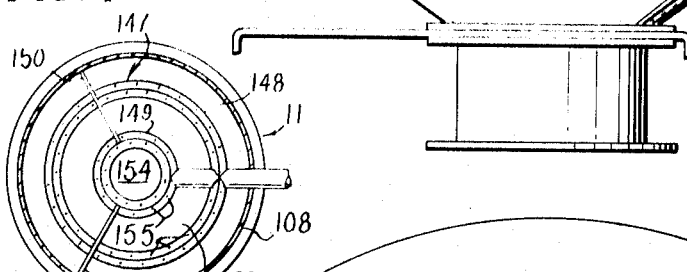
FIG. 7 is a bottom view of a modified air grid of the materials hopper.
Figure 6:
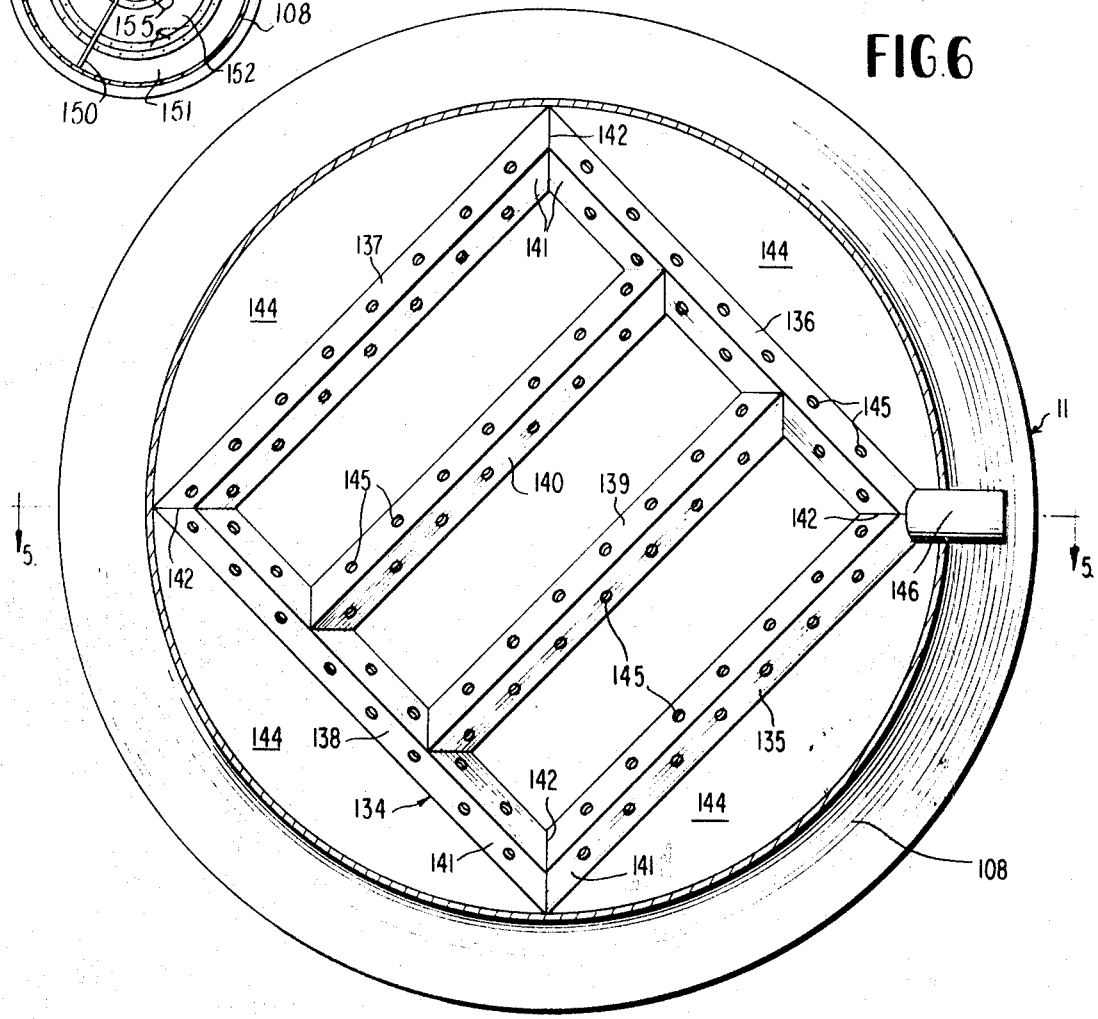
FIG. 6 is a bottom view of the air grid of the materials hopper of FIG. 5.

As is best shown in FIGS. 5, 6, and 7 alternate air flow systems for materials hopper 11 is provided. Conical insert 110 and air dispersal sheet 128 are removed and rectangular air grid 134 or annular air grid 147 is substituted therefore. Rectangular air grid 134 of FIGS. 5 and 6 comprises outer air flow conduits 135, 136, 137 and 138 arranged in the form of a square and in communication with each other at their ends, and cross conduits 139 and 140 arranged parallel to each other and to conduits 135 and 137, and connected at their ends to conduits 136 and 138. Conduits 135-140 are virtually identical in cross section and are oriented to position one side of each at an angle which corresponds to the angle of incline of lower conical portion 108. This lower outer side 141 of each of the air flow conduits 135-138 abuts the corresponding lower outer side of the next adjacent air flow conduit 135-138 at an edge 142 (FIG. 6) which also corresponds to the angle of incline of lower conical portion 108 of hopper 11. Thus, when air grid 134 is placed within hopper 11, it rests with angled edges 142 in abutment with the inside surface of lower conical portion 108 (FIG. 5), and its airflow conduits 135-138 which form the outer square of the grid define spaces 144 which are segments of a circle. Both the inner and outer lower walls of air flow conduits 135-138 and both lower walls of cross flow conduits 139 and 140 define a plurality of small spaced air openings 145. A large opening is defined in air grid 134 at one corner thereof and inlet tube 146 is connected thereto. Inlet tube 146 extends through the side of lower conical portion 108 of materials hopper 11 and is connected to inlet conduit 26 of materials dryer 10. With this arrangement, the air flowing through inlet conduit 26 enters air grid 134 and passes in a downward sloped direction through air openings 145 within lower conical portion 108 of materials hopper 11. The angles of the walls of air flow conduits 135-140 is such that the air is dispersed throughout the entire lower area of lower conical portion 108, through the material in this portion of the hopper, and eventually moves in an upward direction back through air grid 134 toward outlet conduit 25.

Annular air grid of FIG. 7 comprises a pair of concentric circular air flow conduits 148 and 149 supported by fins 150 from the lower conical portion 108 of hopper 11. Annular air grid defines crescent-shaped openings 151 and 152 and circular opening 154 for the passage of material, and the air flow conduits define air openings 155 in their lower walls. The function of the annular air grid is similar to the rectangular air grid.

OPERATION

When materials dryer 10 is connected to materials hopper 11 and placed in operation, main switch 45 and start switch 160 are closed which energizes blowers 29 and 39, transformer 53, timer 56 and heater relay 47 and its heater 54 through conductors 59 and 60. Also, certain ones of indicating lights 61–64 and 68–70 are energized which indicate the condition of the dryer. As is best shown in FIG. 1, positive displacement blower 29 creates an air flow from materials hopper 11 through outlet conduit 25, filter 28, and blower 29. Air diverter valve 22 causes the flow of air to enter either desiccant tower 14 or 15. With air diverter valves 22 and 23 in the positions illustrated in FIG. 1, the air will enter the upper portion of desiccant tower 14 and pass in a downward direction through the desiccant bed. The air exits desiccant tower 14 through exhaust conduit 18, passes through air diverter valve 23 and conduit 26 and enters heat exchanger 31. Temperature sensors 32 and 34 sense the temperature of the air flow and energize blower 49 or heating element 55. If the air temperature is lower than the optimum range of temperatures desired, heating element 55 will be energized. Conversely, if the air temperature is higher than the optimum temperature range, blower 49 will be energized. Temperature sensors 32 and 34 are set at the upper and lower limits of the optimum temperature range, so that if the air flow from desiccant bed 20 happens to be within the optimum temperature range, neither heating element 55 nor blower 40 will be energized.

As is shown in FIG. 3, the air flowing into heat exchanger 31 enters heating chamber 89 and passes about heating elements 55. The arrangement is such that the air flows in a direction which extends generally along the entire length of heating elements 55 before the air reaches passage 95 between the edge 94 of partition 88 and side wall 81. At this point, the air passes to the space between diverter plate 96 and partition 88, and passes through air openings 98 in diverter plate 96 to enter cooling chamber 90. Air openings 98 are spaced and sized so that the flow of air through cooling chamber 90 is substantially uniform throughout its height and width, and the fins 101 of heat exchanging elements 99 function to transfer heat from the air toward conduits 100. As the air reaches the discharge end of heat exchanger 31, it enters plenum 102 and is exhausted into inlet conduit 26, where it passes toward materials hopper 11. In order to assure optimum heat exchange between the air flowing through conduits 100, the folded metal strips 103 provide additional heat exchange surface within conduits 100 so that the air flowing through the conduits more effectively absorbs the heat transferred to these conduits from fins 101.

As is best shown in FIG. 4, the air passing from heat exchanger 31 enters materials hopper 11 through lower conical portion 108. The air passes into annular conical air flow space 118 between conical insert 110 and the lower conical portion 108 of hopper 11. The air then passes through the air openings 119 spaced about conical insert 110, and through air dispersal sheet 128, into the material within materials hopper 11. Air openings 119 function to disperse the air uniformly about the lower portion of the material within the hopper, and air dispersal sheet 128 further disperses the air so that the air enters hopper 11 from virtually the entire inner surface of the lower portion of the hopper. In this manner, there is virtually no hazard of air channeling or streaming within the hopper, and the air permeates the entire lower portion of the material within the hopper so that optimum material drying is achieved. Moreover the air flow is such that the material tends to be fluidized or lifted within the hopper, and the material particles tend to flow with respect to each other, which allows air to flow between the particles to enhance drying of the material particles and to increase the flow characteristics of the material particles when valve plate 126 is operated to dispense the material through drop out tube 124. Since the air flow through the material within hopper 11 is initiated at the bottom of the hopper, the material within the hopper is dried most effectively just prior to being dispensed from the hopper.

When rectangular air grid 134 (FIGS. 5 and 6) or annular air grid 147 (FIG. 7) are used in place of conical insert 110 and air dispersal sheet 128, the air entering hopper 11 flows in downwardly and laterally sloped directions through the material in the lower portion of the hopper so that optimum drying of the materials is achieved in the lower portion of the hopper. Furthermore, when some of the material is dispensed from the hopper, the material above the air grid must pass between the matrix of air flow conduits which tends to cause the material to flow and shift about the conduits to reach the optimum drying area beneath air grid. This tends to separate the material particles from one another, and when the air passes back up through the air grid to reach outlet conduit 25, a substantial amount of drying and flowing of the material is achieved between and around the air flow conduits.

When the air flows from materials hopper 11 back through the outlet conduit 25, it is filtered by filter 28, so that the desiccant beds 20 or 21 will not be contaminated. Since blower 39 is a positive displacement blower, the flow of air through outlet conduit 25 toward a desiccant bed will be virtually constant, regardless of the condition of filter 28. Green indicating light 70 is continuously illuminated while dryer 10 is in operation which indicates that the system is operating under optimum conditions. When filter 28 is clean, and no other obstruction to the air flow exists, pressure sensing device 30 will detect a relatively high pressure in outlet conduit 25 between filter 28 and blower 29 and only green indicating light 70 will be illuminated. When filter 28 becomes partially blocked, or a slight flow restriction is encountered, which will tend to lower the pressure between filter 28 and blower 29 in outlet conduit 25, the lower pressure will be detected by pressure sensing device 30, and it functions to illuminate amber indicating light 69 to provide a visual indication of the condition of filter 28. At this point, the operation of materials dryer 10 should be terminated and filter 28 cleaned or replaced with a new filter or other obstruction to the air flow removed. If filter 28 is not cleaned or replaced or the other obstruction to the air flow removed and the materials dryer 10 is allowed to continue in operation, filter 28 can continue to become blocked and the other obstructions can become greater, which will result in an increasing lower pressure within outlet conduit 25 between filter and blower 29, so that red indicating light 68 is eventually energized by pressure sensing device 30. Since relay switch 46 is in the circuit with indicating light 68, switch 46 will be opened, and the operation of materials dryer 10 will be terminated. Thus, an automatic termination of the operation of the system is achieved without the requirements of an attendent.

As materials dryer 10 operates, the moisture in the air from materials hopper 11 will be absorbed by desiccant bed 20 and the air will be returned to materials hopper 11 in virtually optimum temperature and humidity condition. After desiccant bed 20 is utilized in the closed loop flow system for a predetermined time which is calculated to allow desiccant bed 20 to become saturated with moisture to a predetermined degree, timer 56 energizes solenoid 58 (FIG. 2) to shift air diverter valves 22 and 23, which causes the air to flow through desiccant tower 15.

During the operation of the closed loop system through desiccant towers 14 or 15 and materials hopper 11, the desiccant tower not in the closed loop system is regenerated or dried by means of blower 39 and air heater 40. Air from the atmosphere enters filter 38 and is urged through air heater 40 which heats the air to a temperature of 400° F. and above. The air flows from air heater 40 through hot air inlet conduit 36 toward diverter valve 22. With diverter valve 22 in the position as shown in FIGS. 1 and 2, the hot air enters desiccant tower 15 and functions to remove the moisture from the desiccant bed. The air flowing away from desiccant tower 15 through conduit 19 enters air diverter valve 23, where it is discharged through discharge opening 35 to the atmosphere. When timer 56 and solenoid 58 function to shift air diverter valves 22 and 23, the hot air from air heater 40 will enter desiccant tower 14 at its upper end and pass in a downward direction through desiccant bed 20, pass through exhaust conduit 18 and flow through discharge opening 35 of diverter valve 23 to the atmosphere. Thus, when desiccant bed 20 or 21 is being used in the closed loop system with materials hopper 11 to dry the hygroscopic plastic material within the materials hopper, the opposite desiccant bed 21 or 20 will be regenerated by the hot air stream from air heater 40 and its blower 39.

The material within materials hopper 11 is usually a hygroscopic plastic material, and the various hygroscopic plastic materials should be dried at a temperature usually as low as 130° F. and as high as 350° F. Heat exchanger 31 has been constructed to regulate the temperature of the air within these limits. Of course, the optimum drying temperature of each material varies with the material, and the optimum acceptable range of temperatures for each materials is different. Some plastics could be dried at a temperature level as low as 100° F. for optimum results, and when treating these special materials it is usually necessary to add refrigerated cooling coils to heat exchanger 31. Heat exchanger 31 is constructed so that it adjusts the temperature of the air flowing from desiccant towers 14 or 15 to that desired for the particular material within materials hopper 11. If the air temperature is too low, heating elements 55 will be energized by temperature sensor 32 and relay 78. If the air temperature is too high, blower 49 will be energized by temperature sensor 34 and relay 79.

Since it is desirable to regenerate or dry the inactive desiccant bed at a temperature usually above 400° F., a substantial amount of residual heat will be retained in the dry desiccant bed so that temperature of air flow from a desiccant 20 or 21 that has just been dried will usually be much higher than the optimum temperature range desired for the material within materials hopper 11. Moreover, most materials which are to be dried by materials dryer 10 will become unstable at a temperature substantially below 400° F. Thus, when air diverter valves 22 and 23 are shifted by timer 56 and solenoid 58, temperature sensor 32 will detect the increasing air temperature in inlet conduit 26, and blower 49 will be energized so that cooling chamber 90 is effective to extract a large amount of heat from the air flowing toward materials hopper 11. This condition will continue until the temperature of the desiccant bed in the closed loop flow stream is lowered. Thus, the inactive desiccant bed which is being regenerated or dried can be dried at a temperature in excess of 400° F. and air diverter valves 22 and 23 can be shifted to bring the hot dry desiccant bed into the closed loop air stream system virtually without hazard of damaging the material within materials hopper 11.

When air diverter valves 22 and 23 are shifted, double pole switches 65 and 66 will cause two of the indicating lights 61, 62, 63 and 64 to be illuminated to indicate which of the desiccant beds is active and which is being regenerated. When the diverter valves are in the positions shown in FIGS. 1 and 2, green indicating light 61 and red indicating light 64 will be illuminated while indicating lights 62 and 63 are not illuminated. This indicates that desiccant tower 14 is active (green) while desiccant tower 15 is regenerating (red). When the air diverter valves are shifted, green indicating light 63 and red indicating light 62 are illuminated, indicating that desiccant tower 14 is regenerating (red) while desiccant tower 15 is active (green). With this arrangement a person observing the indicating lamps can determine which towers are active and regenerating, if timer 56 and solenoid 58 are operative, and the time intervals between the shifting of the air diverter valves.

In one embodiment of the invention, positive displacement blower 29 has a capacity to flow approximately 110 cubic feet per minute of air into the active desiccant tower 14 or 15, while blower 39 has a capacity to flow approximately 30 cubic feet per minute through the regenerating desiccant tower. The flow characteristics of the system are such that the air pressure within the active desiccant tower and the closed loop conduit system is much higher than the air pressure within the regenerating desiccant tower and its conduit system. Thus, if any air loss is experienced across air diverter valves 22 and 23, the air loss will be generally toward the regenerating desiccant tower and away from the active desiccant tower. With this arrangement, it will be virtually impossible for moist air to enter the active desiccant tower from the regenerating desiccant tower.

The conduit arrangement is such that the flow of air through the desiccant beds is generally in a downward direction. This eliminates any possibility of channeling with the desiccant bed, as might be experienced if the flow of air was in an upward direction and lifted some of the desiccant and formed a passage of least air resistance through the bed. Thus, the flow of air through the desiccant bed is generally uniform throughout the cross section of the desiccant bed, which accomplishes optimum drying of the air. This same air flow arrangement is created in the regenerating desiccant bed to assure that uniform dryness of the desiccant is achieved. This air flow arrangement also eliminates any possibility of desiccant bed fluoridation which tends to break up desiccant particles. By contrast, the flow of air through the material within materials hopper 11 is generally in an upward direction to prevent any packing of the material as might occur if the flow of air were in a downward direction.

While the drying of the material within the materials dispensing hopper has been disclosed as a closed loop system, the system can be converted to an open loop system by disconnecting outlet conduit 25 from hopper 11 and filter 28. With this arrangement the air entering filter 28 and the drying air stream will be atmospheric air and the air exhausted from hopper 11 will flow to the atmosphere. In some situations this arrangement can prove desirable.

While two temperature sensors 32 and 34 have been disclosed as controlling heater 55 and blower 49, a single double switch controller (not shown) can be used instead to reduce the construction expense of the system.

While this invention has been described in detail with particular reference to preferred embodiments thereof, it will be understood that variations and modifications can be effected within the spirit and scope of the invention as described hereinbefore and as defined in the appended claims.

I claim:

1. A method of drying particulate plastic material or the like comprising continuously flowing gas through a first desiccant bed, maintaining the temperature of the gas within a predetermined temperature range and flowing the gas to the plastic material, and simultaneously drying a second desiccant bed at a temperature higher than said predetermined temperature range; then flowing the gas through the second desiccant bed, maintaining the temperature of the gas within said predetermined temperature range and flowing the gas to the material, and simultaneously drying the first desiccant bed at a temperature higher than the predetermined temperature range, filtering the gas as the gas flows toward the first or second desiccant bed, sensing the change of pressure drop of the gas flowing toward the first or second desiccant bed, actuating an indicating device when the pressure drop of the gas exceeds a first predetermined level, and terminating the flow of gas when the pressure drop of the gas exceeds a second predetermined level.

2. A method of drying particulate plastic material or the like comprising continuously flowing gas through a first desiccant bed, maintaining the temperature of the gas within a predetermined temperature range and flowing the gas to the plastic material, and simultaneously drying a second desiccant bed at a temperature higher than said predetermined temperature range; then flowing the gas through the second desiccant bed, maintaining the temperature of the gas within said predetermined temperature range and flowing the gas to the material, and simultaneously drying the first desiccant bed at a temperature higher than the predetermined temperature range, filtering the gas as the gas flows toward the first or second desiccant bed, sensing the change of pressure drop of the gas flowing toward the first or second desiccant bed, and terminating the flow of gas when the pressure drop exceeds a predetermined level.

3. A method of drying particulate plastic material or the like comprising continuously flowing gas through a first desiccant bed, maintaining the temperature of the gas within a predetermined temperature range and flowing the gas to the plastic material, and simultaneously drying a second desiccant bed at a temperature higher than said predetermined temperature range; then flowing the gas through the second desiccant bed, maintaining the temperature of the gas within said predetermined temperature range and flowing the gas to the material, and simultaneously drying the first desiccant bed at a temperature higher than the predetermined temperature range, filtering the gas as the gas flows toward the first or second desiccant bed, sensing the change of pressure drop of the gas flowing to the first or second desiccant bed, and actuating an indicating device when the pressure drop exceeds a predetermined level.

4. The invention of claim 1 and wherein the steps of flowing the gas through the first and second desiccant bed comprises flowing the gas generally in a downward direction through the desiccant beds and generally in an upward direction through the material.

5. The invention of claim 1 and wherein the steps of drying the first and second desiccant beds comprise flowing gas from the atmosphere through the first or second desiccant beds, and heating the gas to a temperature higher than the predetermined temperature range before the gas flows through the first or second desiccant beds.

6. The invention of claim 5 and wherein the step of heating the gas comprises heating the gas to a temperature sufficient to raise the temperature of the desiccant bed above 400 degrees Fahrenheit.

7. The invention of claim 1 and further including the step of flowing the gas from the material to the first or second desiccant bed in a substantially closed loop system.

8. The invention of claim 1 and further including the step of flowing the gas from the atmosphere to the first or second desiccant bed in an open loop system.

9. A method of conditioning particulate plastic material or the like comprising continuously flowing a first stream of air through a first desiccant bed and through the material to dry the material, simultaneously flowing a second stream of air through a heating means and through a second desiccant bed to dry the second desiccant bed, switching the first stream of air from the first desiccant bed to the second desiccant bed, and the second stream of air from the second desiccant bed to the first desiccant bed, maintaining the temperature of the air flowing through the material in a predetermined temperature range, and flowing the first stream of air through said first or second desiccant beds at a higher pressure than the second stream of air is flowed through the other of said second or first desiccant beds.

10. The invention of claim 9 and further including the step of flowing the air from the material to the first or second desiccant beds in a substantially closed loop system.

11. The invention of claim 9 and further including the step of flowing the air from the atmosphere to the first or second desiccant bed in an open loop system.

12. Apparatus for drying particulate plastic material or the like comprising a material container, first and second desiccant beds, first flow means for flowing a first stream of air through said first desiccant bed and through said material container, air heating means, second flow means for flowing a second stream of air through said air heating means and through said second desiccant bed, means for diverting the first stream of air from said first desiccant bed to said second desiccant bed and for diverting the second stream of air from said second desiccant bed to said first desiccant bed, and heat exchanging means for maintaining the temperature of the air flowing through the material container within a selected temperature range said air heating means being constructed and arranged to heat the desiccant beds to a temperature above 400 degrees Fahrenheit.

13. The invention of claim 12 and wherein said first and second flow means are constructed and arranged to flow air generally in a downward direction through said first and second desiccant beds and generally in an upward direction through the material container.

14. The invention of claim 12 and wherein said first flow means comprises a positive displacement compressor.

15. The invention of claim 12 and wherein said heat exchanging means includes both air heating means and air cooling means for regulating the temperature of the air flowing through the material.

16. The invention of claim 12 and wherein said material container includes an upper section and a lower section with downwardly and inwardly sloping sides that define a bottom material discharge opening, and means for dispersing the first stream of air in said lower section.

17. The invention of claim 16 and wherein said means for dispersing the first stream of air in the lower section comprises an insert positioned within said lower section, said insert defining an air flow space within said lower section and air openings in said insert communicating said insert with said lower section, and means for flowing the first stream of air into said air flow space and through said air openings into the material in said material container.

18. The invention of claim 17 wherein said insert comprises a grid of air conduits extending across said lower section.

19. The invention of claim 17 and wherein said insert is of open ended conical shape.

20. Apparatus for drying particulate plastic material or the like comprising a material container, first and second desiccant beds, first flow means for flowing a first stream of air through said first desiccant bed and through said material container, air heating means, second flow means for flowing a second stream of air through said air heating means and through said second desiccant bed, means for diverting the first stream of air from said first desiccant bed to said second desiccant bed and for diverting the second stream of air from said second desiccant bed to said first desiccant bed, and heat exchanging means for maintaining the temperature of air flowing through the material container within a selected temperature range, said heat exchanging means being constructed and arranged to maintain the air flowing therefrom in a temperature range of from about 130 degrees Fahrenheit to about 350 degrees Fahrenheit.

21. Apparatus for drying particulate plastic material or the like comprising a material container, first and second desiccant beds, first flow means for flowing a first stream of air through said first desiccant bed and through said material container, air heating means, second flow means for flowing a second stream of air through said air heating means and through said second desiccant bed, means for diverting the first stream of air from said first desiccant bed to said second desiccant bed and for diverting the second stream of air from said second desiccant bed to said first desiccant bed, heat exchanging means for maintaining the temperature of the air flowing through the material container within a selected temperature range, filter means for filtering the first stream of air, pressure sensing means for detecting a change in pressure drop up stream of said first flow means, and means responsive to the pressure sensing means for actuating an indicating device or the like.

22. Apparatus for drying particulate plastic material or the like comprising a material container, first and second desiccant beds, first flow means for flowing a first stream of air through said first desiccant bed and through said material container, air heating means, second flow means for flowing a second stream of air through said air heating means and through said second desiccant bed, means for diverting the first stream of air from said first desiccant bed to said second desiccant bed and for diverting the second stream of air from said second desiccant bed to said first desiccant bed, heat exchanging means for maintaining the temperature of the air flowing through the material container within a selected temperature range, filter means for filtering the first stream of air, pressure sensing means for detecting a change in pressure drop up stream of said first flow means, and means responsive to the pressure sensing means for terminating the flow of the first air stream.

23. Apparatus for drying particulate plastic material or the like comprising a material container, first and second desiccant beds, first flow means for flowing a first stream of air through said first desiccant bed and through said material container, air heating means, second flow means for flowing a second stream of air through said air heating means and through said second desiccant bed, means for diverting the first stream of air from said first desiccant bed to said second desiccant bed and for diverting the second stream of air from said second desiccant bed to said first desiccont bed, and heat exchanging means for maintaining the temperature of the air flowing through the material container within a selected temperature range, said first flow means being constructed and arranged to flow air at a higher pressure than said second flow means.

References Cited
UNITED STATES PATENTS

| 2,480,146 | 8/1949 | Lee | 34—80 X |
| 2,699,837 | 1/1955 | Van Note | 55—179 |
| 3,370,361 | 2/1968 | Guerrieri | 34—57 |

EDWARD G. FAVORS, Primary Examiner

U.S. Cl. X.R.

34—57, 80; 55—179